(12) United States Patent
Eves

(10) Patent No.: US 7,251,332 B2
(45) Date of Patent: Jul. 31, 2007

(54) PORTABLE AUDIO DEVICES

(75) Inventor: David A. Eves, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1100 days.

(21) Appl. No.: 09/860,360

(22) Filed: May 18, 2001

(65) Prior Publication Data

US 2001/0050991 A1    Dec. 13, 2001

(30) Foreign Application Priority Data

Jun. 12, 2000    (GB)    ................................. 0014328.9

(51) Int. Cl.
*H04H 5/00* (2006.01)
*H04R 1/02* (2006.01)

(52) U.S. Cl. ........................................ 381/11; 381/333

(58) Field of Classification Search .................. 381/11, 381/301, 333, 388, 385, 334, 309, 311, 123, 381/74; 455/575.2
See application file for complete search history.

(56) References Cited

U.S. PATENT DOCUMENTS

| | | | | |
|---|---|---|---|---|
| 4,245,136 A | * | 1/1981 | Krauel, Jr. ................... | 381/309 |
| 4,539,700 A | | 9/1985 | Sato ............................. | 381/90 |
| 4,621,372 A | * | 11/1986 | Relyea ........................ | 381/123 |
| 4,876,724 A | | 10/1989 | Suzuki ........................ | 381/187 |
| 5,109,410 A | * | 4/1992 | Suhami et al. .............. | 381/151 |
| 5,515,442 A | * | 5/1996 | Dombrowski, Jr. ........... | 381/11 |
| 5,757,929 A | | 5/1998 | Wang et al. .................. | 381/24 |
| 5,978,689 A | * | 11/1999 | Tuoriniemi et al. ...... | 455/575.2 |
| 6,091,832 A | | 7/2000 | Shurman et al. ............ | 381/381 |
| 6,700,981 B1 | * | 3/2004 | Howard ....................... | 381/309 |
| 6,748,095 B1 | * | 6/2004 | Goss ........................... | 381/388 |

FOREIGN PATENT DOCUMENTS

| | | |
|---|---|---|
| CA | 2014104 | 10/1991 |
| EP | GB2319927 | 6/1998 |
| WO | WO9603847 | 2/1996 |
| WO | WO9807239 | 2/1998 |
| WO | WO9903294 | 1/1999 |
| WO | WO0064129 | 10/2000 |

OTHER PUBLICATIONS

Patent Abstracts of Japan, Okabe Michio, "Portable Telephone Set With Audio Function And Personal computer Interface System Therefor," Publication No. 2001069198, Mar. 16, 2001, Application No. 11242219, Aug. 27, 1999.

* cited by examiner

*Primary Examiner*—Stella Woo

(57) ABSTRACT

The components of a portable personal audio system include first and second audio signal source devices, such as an MP3 player (14) and telephone (16). These are connected via respective leads (12) to a control and switching stage (22), and from there to left and right audio output devices (26). User input to effect operation of the control and switching stage (22) selectively directs audio signals from one or both of the signal source devices (14, 16) to a selected one or ones of the left and right audio output devices (26).

19 Claims, 3 Drawing Sheets

PORTABLE AUDIO DEVICES

Figure 1:
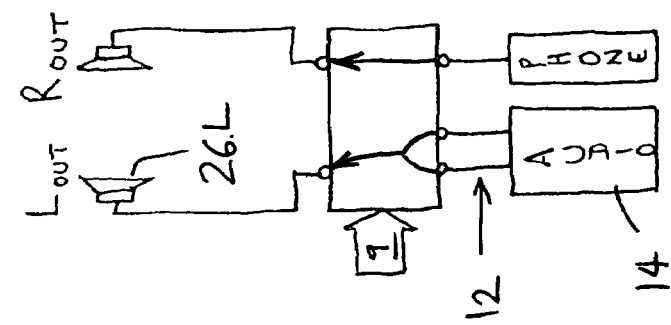

The present invention relates to portable electronic devices and systems and in particular, although not exclusively, to personal audio systems and telecommunications devices. The invention further relates to garments provided with means for receiving a plurality of such, suitably interconnected, electronic devices.

Recent years have seen a great increase in the availability and functionality of portable audio devices, coupled with a reduction in size and weight. Such audio devices may be divided generally into two categories, namely those replaying locally stored audio, and those relaying audio signals received from remote sources. Examples of the former are personal cassette or compact disc (CD) players, having a separate storage medium for holding the audio data, or integral memory and player devices such as MP3 players. Examples of the latter are mobile telephone and radio.

With no single standard or format prevailing, a user may find themselves carrying a number of such audio source devices. As has been recognised, this can be wasteful in so far as a number of device components (audio output devices, displays, power supplies) are repeated, and efforts have been made to provide integrated portable systems where such components may be shared between a number of applications. An example of an integrated but portable system is given in U.S. Pat. No. 5,148,002 (Kuo et al) which describes a multi-functional garment comprised of an outer shell garment hosting a number of interconnected electronic modules, including heating, communications and display devices.

A further example of an integrated system is given in U.S. Pat. No. 4,539,700 (Sato) which describes a personal portable audio device in the form of a garment having a number of pockets for receiving components of the system, with a pair of speakers for reproduction of the audio being provided in the left and right shoulder portions of the garment: the wiring from the audio signal source component to the speakers is hidden within the garment construction, including connectors within the pockets for establishing electrical connection to a device placed therein.

The Sato patent illustrates one means for responding to a problem of system integration and particularly device interconnection—namely the wearer of the garment becoming entangled in the wiring interconnecting the various modules or components. However, it fails to address usability issues arising from the integration, namely what happens where two or more devices are connectable, or are requiring connection, to a single device or attribute of the system.

It is accordingly an object of the present invention to provide a portable integrated system having means whereby connection between differing devices and components, particularly those in competition for a particular system resource, is facilitated.

In accordance with a first aspect of the present invention, there is provided a portable personal audio system comprising first and second audio signal source devices linked via a control and switching stage to left and right audio output devices, the control and switching stage being user operable to selectively direct audio signals from one or both of the signal source devices to a selected one or ones of the left and right audio output devices. The provision of user operable means to selectively direct audio to a users chosen output gives improved flexibility of operation for a user.

Where one of the audio signal source devices outputs a stereo pair of signals, the control and switching stage is preferably user operable to direct respective ones of the stereo pair of signals to respective ones of the left and right audio output devices. Additionally, the control and switching stage may be user operable to combine the stereo pair of signals to a mono signal and output the same to a selected one or ones of the left and right audio output devices. In this way, the user can keep one ear on the ambient or environmental sounds, whilst not losing half the audio signal component through simply not wearing one earphone or other audio output device.

In a preferred embodiment, one of the audio signal source devices comprises a portable telecommunications apparatus. In such a case, the control and switching stage may be configured to identify when this portable telecommunications apparatus receives an incoming call and, in response, to set up a predetermined pattern of audio signal directions to selected one or ones of the left and right audio output devices.

According to a further aspect of the present invention, there is provided a garment comprising a portable audio system as recited above. Such a garment may suitably comprise a fabric shell hosting one or more electrical conductors the or each of which is connectable to at least one of a plurality of electronic devices, including the first and second audio signal source devices, housed in respective pockets of said fabric shell. For ease of use, such a garment may have externally mounted user-operable control devices connected to and controlling operation of the said control and switching means.

In a garment embodying the invention, the left and right audio output devices are suitably respective earphones, the connecting wire to which is preferably at least partially concealed within the fabric construction of the garment. As to the devices themselves, the or each is preferably removably attached to said fabric shell such as to permit removal for ease of cleaning for the garment, and ease of upgrade for the device.

Further features of the present invention will become apparent from reading of the following description of preferred embodiments, and are defined in the attached claims, to which reference should now be made, and the disclosure of which is incorporated herein by reference.

Figure 5:
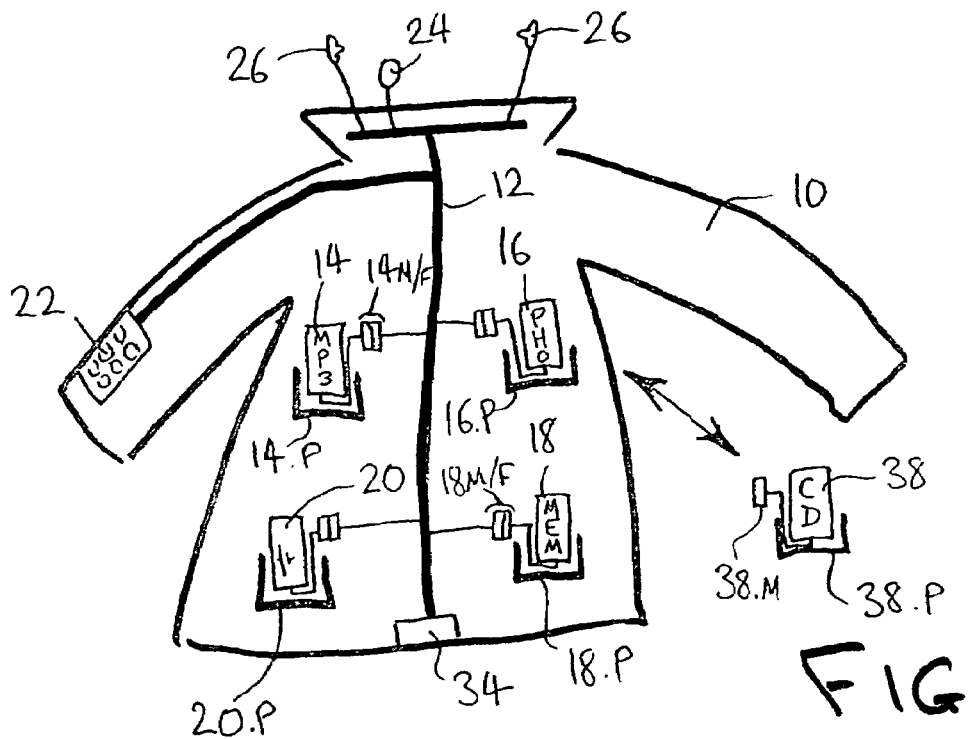
Figure 6:
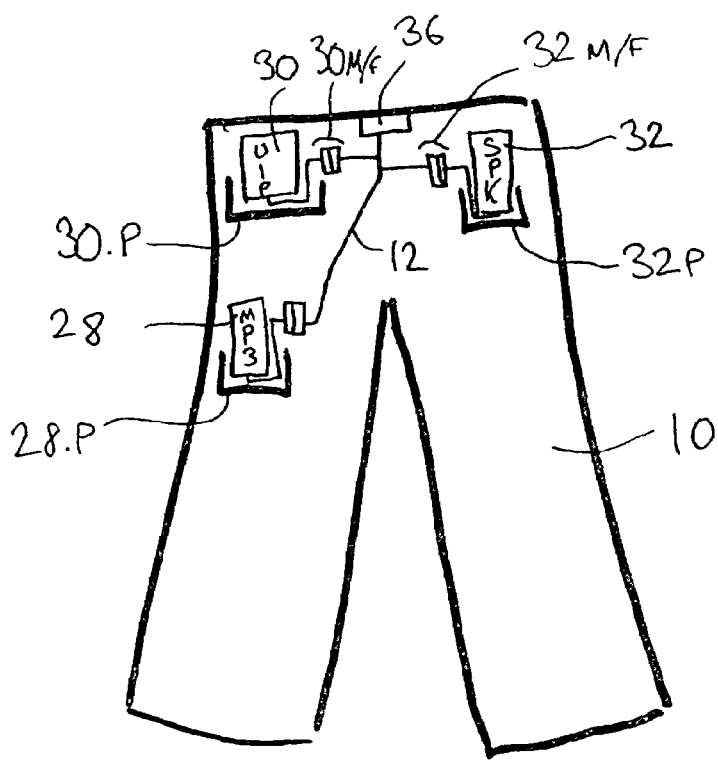
Figure 7:
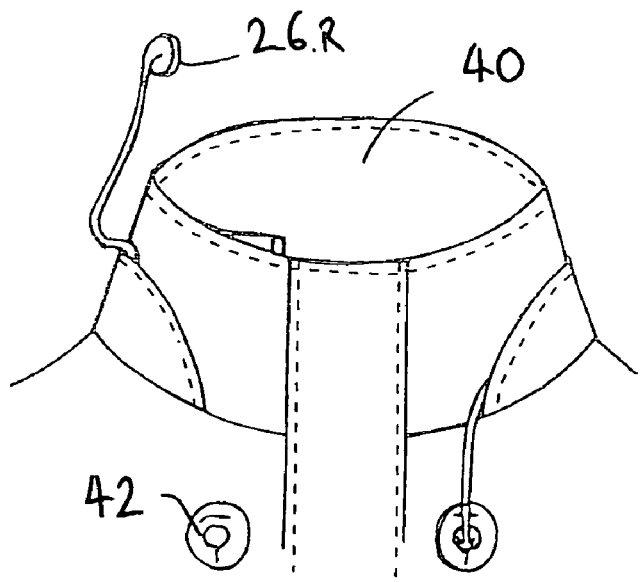
Figure 8:
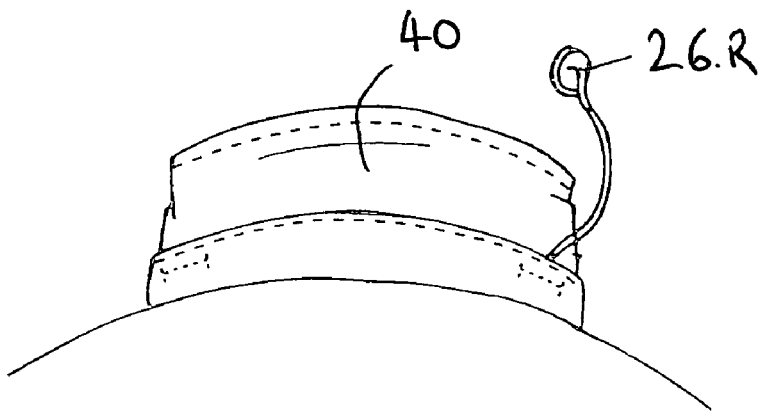

Embodiments of the invention will now be described by way of example with reference to the accompanying drawings in which:

FIGS. 1 to 4 schematically represent different interconnect arrangements for four audio system components;

FIGS. 5 and 6 schematically represent garments having integral portable audio systems distributed amongst a plurality of devices housed in respective removable pockets; and FIGS. 7 and 8 represent a garment collar with integral audio output components.

Starting with FIGS. 1 to 4, the components of a portable personal audio system are illustrated. The components include first and second audio signal source devices, in this instance an MP3 player 14 and telephone 16. These are connected via respective leads 12 to a control and switching stage 22, and from there to left and right audio output devices 26, in this case respective ones of a pair of earphones. User input to effect operation of the control and switching stage 22 is indicated by arrow 9.

The user input to control and switching stage 22 selectively directs audio signals from one or both of the signal source devices 14, 16 to a selected one or ones of the left and right earphones 26. In the example of FIG. 1, the MP3 device outputs a stereo (left/right) pair of signals, with the control and switching stage 22 connecting respective ones of the stereo pair of signals to respective ones of the left and right earphones 26: the telephone 16 is assumed to have no current incoming message and is not connected to the earphones 26.

Figures 2, 3:
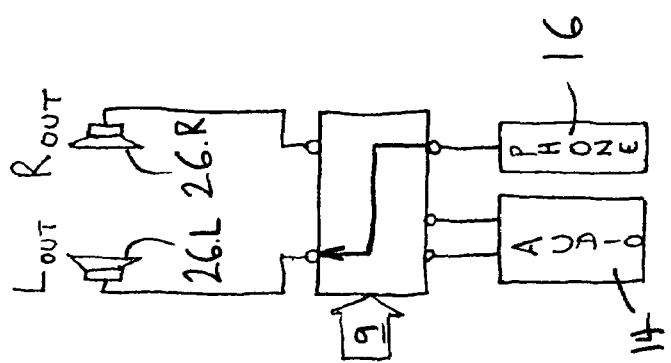

In the example of FIG. 2, just the telephone 16 is in use, with the control and switching stage 22 connecting the telephone audio to the left earphone 26L only: as will be recognised, the telephone audio could equally be connected to the right earphone 26R only, or the signal could be fed to both.

In FIG. 3, just the MP3 player 14 is in use; unlike the FIG. 1 case however, the stereo signal from the source is combined in control and switching stage 22 to provide a mono signal to just one of the earphones (26R as shown, or 26L). This arrangement has particular use where the user wishes to hear the supplied audio, but also hear sounds from the environment.

Figure 4:
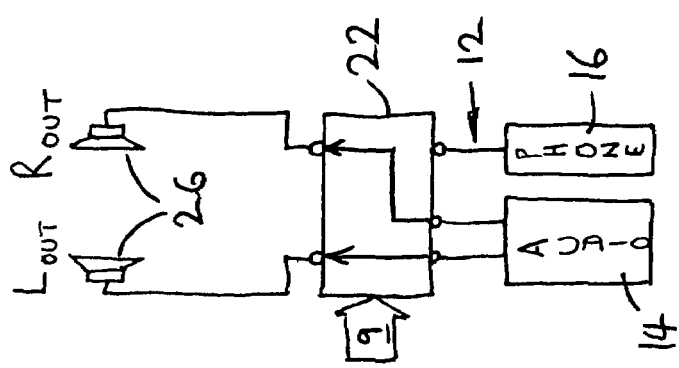

In FIG. 4, both sources 14, 16 and both earphones 26 L/R are in use, with the stereo MP3 audio again reduced to mono and fed to a single earphone 26L; this time the telephone audio fed to the other earphone 26R. In this arrangement, where the different audio streams compete for the users attention, the telephone audio is suitably given primacy, with the MP3 muted when a call comes in. General and individual volume adjustment for the various streams is preferably provided to the user by the stage 22.

Preferably, the control and switching stage 22 is configured to identify when the telephone 16 receives an incoming call—an indicator signal may be sent from the telephone to stage 22 for this purpose: in response, stage 22 may be constructed to automatically set up a predetermined pattern of audio signal connections to a selected one or ones of the left and right earphones 26. For example, the stage 22 may automatically switch from the arrangement of FIG. 1 or 3 to that of FIG. 2 or 4 on detection of an incoming telephone call. Such switching can also be made when the user selects to make an outgoing call.

Turning now to FIGS. 5 and 6, schematic representations of garments (for upper and lower body respectively) are shown hosting a plurality of interconnected electrical devices, including the audio sources from FIGS. 1 to 4. It will be recognised that the form, function and style of the garment will generally have no bearing on the operation of the present invention other than requiring a capability to support two or more electrical devices (which may be in the form of separate components of a single device distributed around the garment).

Each garment comprises a fabric shell 10 hosting one or more electrical conductors 12, which may range in configuration from a single conductor between a pair of devices to a full wiring loom (as shown) interconnecting a number of devices, to be described: further details of a suitable wiring loom for use with such devices are given in our co-pending concurrently filed application entitled "Garment Component".

In the example of FIG. 5, the devices supported (each in a respective pocket identified by suffix P) comprise the digital audio (MP3) playback device 14 and mobile telephone 16 from before, together with data storage device 18 holding audio data for the player 14 or numbers for the telephone 16, for example, and a power supply 20 for all devices. Also coupled with the loom 12 is a set of sleeve mounted controls providing the control and switching stage 22 for the audio player 14 and telephone 16. Further connections are provided to a microphone 24 for the telephone 16, and the pair of earphones 26L/R for use with either the telephone 16 or audio player 14, as described above.

In the example of FIG. 6, the devices supported—again in respective pockets P—comprise an audio player 28 (assumed to have an integral power source), control device 30 for the player, and speaker 32 or other audio output arrangement, all interconnected by loom 12. As indicated at 34 in FIG. 5 and 36 in FIG. 6, means may be provided to interconnect the wiring looms (and hence supported devices) in separate garments worn by a user.

Each of the devices in their respective pockets is detachable from the fabric shell 10 and loom 12, as indicated by compact disc (CD) player 38 in respective pocket 38.P shown detached from the loom in FIG. 5. This may be attached in place of the telephone 16 (as indicated), with the control and switching stage 22 extended beyond the configuration schematically illustrated in FIGS. 1 to 4 such as to support a pair of stereo audio inputs. Each pocket suitably comprises its own adapter cable terminating in an external male or female connector (suffix M or F) for connection to a corresponding (F or M) connector on the loom 12. As will be recognised, where a single position on the garment can host alternate devices (such as telephone 16 and CD player 38), a common connection should be provided on the loom side of the M/F connector for audio channel and power requirements, such that either device can simply be plugged into the same connector.

In an extension or companion feature to the present invention, the whole or a part of the loom 12 might be incorporated within the garment (as in the Sato citation mentioned in the introduction) or, preferably, it may additionally be removable to permit laundry: such a removable wiring or cabling arrangement is described in our co-pending application entitled "Garment with Removable Electronic Devices"

FIGS. 7 and 8 show the collar portion 40 of garment 10 in front and back views respectively. As can be seen, the earphones 26 emerge discretely from the collar 40 close to the users ears such that there is a minimum of loose cable for the user to become entangled with—either within or outside the garment. To further reduce likelihood of tangling, the garment preferably also features retaining clips or holders 42 into which the earphones may simply be clipped to prevent them swinging about when not in use.

From reading the present disclosure, other modifications will be apparent to persons skilled in the art. Such modifications may involve other features which are already known in the design, manufacture and use of portable audio systems, and garments and applications and devices for incorporation therein and which may be used instead of or in addition to features already described herein.

I claim:

1. A portable personal audio system comprising:
   a control and switching stage, and
   first and second audio signal source devices linked via the control and switching stage to left and right audio output devices, the first and second audio signal source devices being independent of each other, the control and switching stage being user operable to selectively direct audio signals in at least each of the following configurations:
   from one signal source device to one of the left and right audio output devices,
   from one signal source device to both the left and right audio output devices, and from the first signal source device to the left audio output device, and from the second signal source device to the right audio output device.

2. The audio system of claim 1, wherein one of the audio signal source devices outputs a stereo pair of signals, with the control and switching stage being user operable to direct respective ones of the stereo pair of signals to respective ones of the left and right audio output devices.

3. The audio system of claim 1, wherein one of the audio signal source devices outputs a stereo pair of signals, with the control and switching stage being user operable to combine the stereo pair of signals to a mono signal and output the same to a selected one or ones of the left and right audio output devices.

4. The audio system of claim 1, wherein one of the audio signal source devices comprises a portable telecommunications apparatus.

5. The audio system of claim 4, wherein the control end switching stage is configured to identify when the portable telecommunications apparatus receives an incoming call and, in response, to set up a predetermined pattern of audio signal directions to selected one or ones of the left and right audio output devices.

6. The audio system of claim 1, wherein the control and switching stage is further configured for user operation to alter the output volume of one or more audio signals received.

7. The audio system of claim 1, wherein
the control and switching stage is further configured to selectively direct audio signals from a first signal source to the left audio output device and from a second signal source to the right output device.

8. A garment comprising
a portable audio system that includes:
a control and switching stage,
coupling elements that are configured to couple first and second audio signal source devices to the control and coupling stage,
wherein
the control and switching stage being user operable to selectively direct audio signals in at least each of the following configurations:
from one signal source device to one of the left and right audio output devices,
from one signal source device to both the left and right audio output devices, and
from the first signal source device to the left audio output device, and from the second signal source device to the right audio output device.

9. The garment of claim 8, the garment comprising a fabric shell hosting one or more electrical conductors the or each of which is connectable to at least one of a plurality of electronic devices, including the first and second audio signal source devices, housed in respective pockets of the fabric shell.

10. The garment of claim 9, having externally mounted user-operable control devices connected to and controlling operation of the control and switching means.

11. The garment of claim 9, wherein the or each of the electrical devices is removably attached to the fabric shell.

12. The garment of claim 8, wherein the left and right audio output devices are respective earphones, the connecting wire to which is at least partially concealed within the fabric construction of the garment.

13. The garment of claim 8, further including the first and second audio signal source devices.

14. An audio system comprising:
a control switch that is configured to route signals from audio devices to first and second output devices,
a network that allows a first audio device and a second audio device to communicate signals to the control switch, the first audio device being independent of the second audio device,
wherein
the control switch is configured to selectively provide each of the following routes:
a first route wherein signals from the first device are routed to each of the first and second output devices, and
a second route wherein signals from the first device are routed to the first output device and signals from the second device are routed to the second output device.

15. The audio system of claim 14, wherein
the control switch is configured to detect an activation of the second output device, and, upon detection of the activation of the second output device, switch from the first route to the second route.

16. The audio system of claim 15, wherein
the first device includes a stereo device having first and second output signals, and
in the first route, the first output signal is routed to the first output device and the second output signal is routed to the second output device, and
in the second route, the first and second output signals are routed to the first output device.

17. The audio system of claim 16, wherein
the second device includes a telephone device.

18. The audio system of claim 17, further including
at least one of the first and second devices.

19. The audio system of claim 14, further including
a garment that is configured to include the control switch and the network.

* * * * *